July 16, 1968 A. L. HOPPER 3,393,275

SCANNING ARRANGEMENT EMPLOYING SINUSOIDAL MARKING

Filed Feb. 18, 1965 2 Sheets-Sheet 1

INVENTOR
A. L. HOPPER
BY Lucian C. Canepa
ATTORNEY

SCANNING ARRANGEMENT EMPLOYING SINUSOIDAL MARKING

Filed Feb. 18, 1965 2 Sheets-Sheet 2

United States Patent Office 3,393,275
Patented July 16, 1968

3,393,275
SCANNING ARRANGEMENT EMPLOYING SINUSOIDAL MARKING

Andrew L. Hopper, Murray Hill, N.J., assignor to Bell Telephone Laboratories, Incorporated, New York, N.Y., a corporation of New York Filed Feb. 18, 1965, Ser. No. 433,654
15 Claims. (Cl. 179—18)

ABSTRACT OF THE DISCLOSURE

Selected ones of a plurality of lines to be scanned are marked with a sinusoidal signal. Alternate samples derived from each line are respectively supplied to a different pair of associated capacitors. In turn, the potentials stored in each pair of capacitors are processed to generate a voltage proportional to the amplitude of the marking sinusoid impressed on the associated line.

Figure 1:
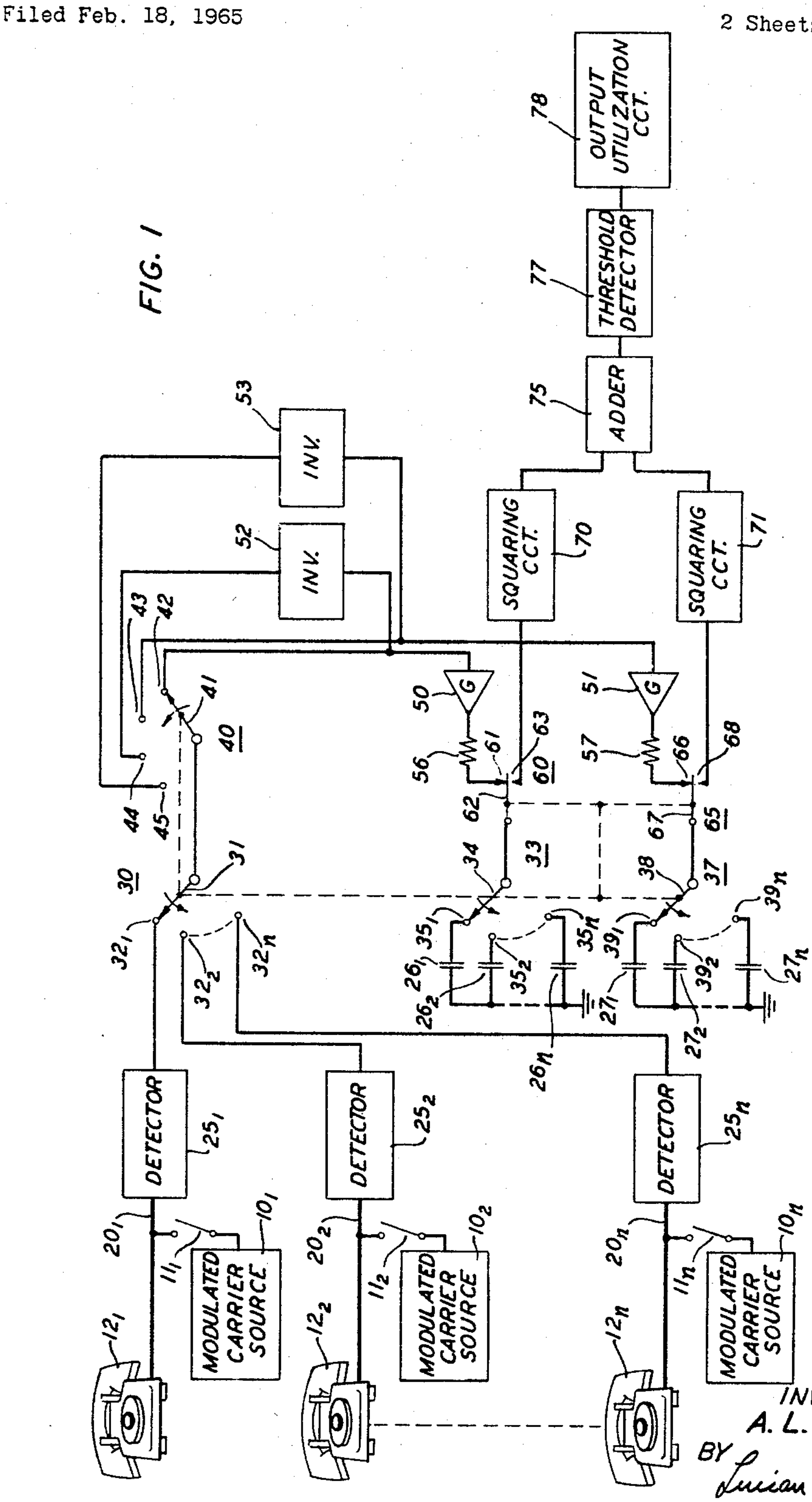

This invention relates to scanning arrangements and, more specifically, to an embodiment for scanning a plurality of electrical lines which are selectively marked with sinusoidal signals.

Many present day electronic systems employ circuitry for selectively impressing a characteristic signal on a plurality of conducting lines to initiate a particular system function associated therewith. For example, in telephony, tagging potentials utilized in conjunction with subscriber lines or trunks may be employed to indicate a special line or trunk priority to common central office equipment in heavy traffic situations or, alternatively, such a marking signal originating at a subscriber location may indicate the incidence of an incoming nuisance call which is to be traced.

It is apparent that the above and other circuit applications require a structure for rapidly and efficiently scanning a plurality of lines for the presence of a marking signal. However, prior art scanning arrangements have been relatively complex, typically including a rather large number of circuit components associated with each line. In addition, prior art embodiments have significantly loaded the monitored conductors and, in the case of communications lines, materially lessened the transmission capabilities thereof.

It is therefore an object of the present invention to provide an improved scanning arrangement.

More specifically, an object of the present invention is the provision of an arrangement for scanning a plurality of electrical lines which are selectively marked with a characteristic sinusoidal signal.

It is another object of the present invention to provide a highly reliable line scanner which may advantageously be inexpensively and easily fabricated.

These and other objects of the present invention are realized in a specific, illustrative arrangement adapted to scan a plurality of telephone lines which are selectively marked with sinusoidal signals characterized by a period T. Each line is examined for a short time interval every $T/4$ seconds, with alternate samples being coupled in an alternating polarity relationship to one of two capacitors associated with each line.

By first squaring and then summing the potentials stored in each capacitor pair, a voltage proportional to the amplitude of the marking sinusoid, is generated if such a signal has in fact been impressed on the corresponding line.

It is thus a feature of the present invention that a scanning arrangement include a plurality of telephone lines, circuitry for selectively impressing sinusoidal signals on the lines, a capacitor pair associated with each line, and circuitry for sampling the lines and for respectively supplying the potentials there detected in alternate sampling intervals to the associated capacitors in an alternating polarity relationship.

It is another feature of the present invention that a sampling arrangement include a plurality of telephone lines, circuitry for selectively impressing sinusoidal signals of a period T on the lines, first and second capacitors associated with each line, circuitry for sampling each of the lines every $T/4$ seconds and for respectively supplying the potentials there detected in alternate sampling intervals to the associated first and second capacitors in an alternating polarity relationship, an adder, and two squaring circuits sequentially connecting each of the associated capacitor pairs to the adder.

Figure 2A:
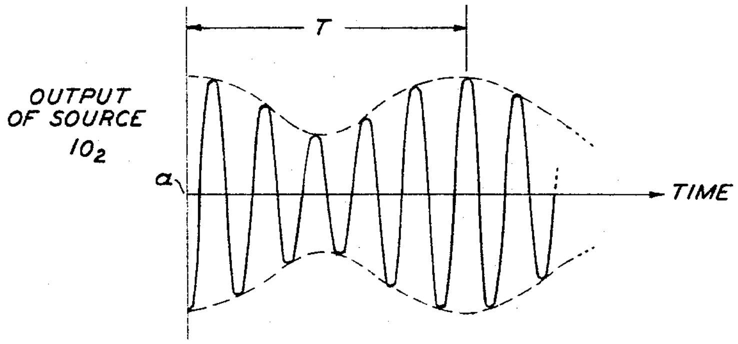
Figure 2B:
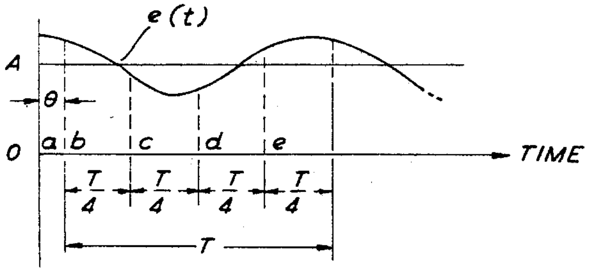

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 is a diagram of a specific, illustrative line scanning arrangement which embodies the principles of the present invention; and FIGS. 2A and 2B comprise timing diagrams depicting the signal waveforms associated with selected circuit elements shown in FIG. 1.

Referring now to FIG. 1, there is shown a specific, illustrative scanning arrangement including $n$ telephone lines 20 which are to be selectively marked. The lines 20 are respectively terminated at their extremities in station sets 12 located at remote subscriber locations, and in amplitude detectors 25 physically placed at a common equipment point. In addition, each remote location includes a source 10 of carrier signals modulated with a sinusoidal signal of a period T, as illustrated in FIG. 2A, which is selectively connectable by a switch 11 to the corresponding line 20. It is noted at this point, that all elements designated by a subscripted numeral are functionally associated with the line 20 identified with a like subscript.

The detectors 25 are connected by an $n$-position cyclically rotating sampling switch 30 to a 4-position switch 40. The switch 30 is adapted to sequentially sample each of $n$ contact terminals 32 included thereon every $T/4$ seconds, with the switch 40 being operative to continuously advance one contact position for each complete switching cycle of the device 30. Accordingly, the switch 40 is cyclically operable with a period T.

Two contact terminals 42 and 43 on the switch 40 are respectively directly connected to two like amplifiers 50 and 51 of forward gain G, and thereby also serially connected to a corresponding one of two like resistors 56 and 57. Two additional switch 40 contact terminals 44 and 45 are respectively connected via two inverting circuits 52 and 53 to the input ports of the amplifiers 50 and 51. The resistors 56 and 57, in turn, are connected to two transfer switches 60 and 65 which include common members 62 and 67 normally connected to the associated switch upper contacts 61 and 66, and hence further normally connected to the resistors 56 and 57. The switch common members 62 and 67 are arranged to transfer to two alternate contacts 63 and 68 respectively associated therewith after the switch 40 has undergone a prespecified number of complete operative cycles.

The transfer switches 60 and 65 are respectively connected to two sets of $n$ capacitors $26_1$ through $26_n$ and $27_1$ through $27_n$ by way of two $n$-position cyclic switches 33 and 37 which are mechanically ganged with the switch 30. It is observed that each pair of capacitors 26 and 27 designated by a like subscript are functionally associated with the scanning process for the corresponding line 20.

When the switch 60 and 65 transfer members 62 and 67 reside at their alternate contacts 63 and 68, the rotary switches 33 and 37 sequentially connect associated capacitor pairs 26 and 27 to two squaring circuits 70 and 71 which are each operative to generate a signal representative of the square of the potential characterizing the capacitor instantaneously connected thereto. The circuits 70 and 71 may advanageously comprise, for example, rectifying diodes operated on the square law portion of their voltage-current characteristics.

An adder 75 is employed to sum the voltages generated by the squaring circuits 70 and 71, and a threshold detector 77 enables an output utilization circuit 78 when the adder output potential exceeds a critical minimum level. The particular embodiment of the output utilization circuit 78 varies in accordance with the functional reason for which the lines are marked. For example, should the marking be for line priority purposes, as discussed hereinabove, the output circuit 78 would be operative to connect the next available call-originating register to the designated line.

With the above structural organization in mind, a typical sequence of circuit operation for the FIG. 1 sampling arrangement will now be described. As initial conditions, the transfer switch common members 62 and 67 are respectively connected to the contacts 61 and 66, and the switch 40 common member 41 is connected to the contact terminal 42, as illustrated in FIG. 1. Assume that at the time *a* shown in FIGS. 2A and 2B, a subscriber at the station set $\mathbf{12}_2$ closes the switch $\mathbf{11}_2$, thereby connecting the source $\mathbf{10}_2$ to the line $\mathbf{20}_2$ and impressing the modulated carrier signal, shown in FIG. 2A, on the line. This potential is propagated by the line $\mathbf{20}_2$ to the amplitude detector $\mathbf{25}_2$ which, in response thereto, generates the envelope-detected signal $e(t)$ shown in FIG. 2B, wherein $$e(t)=A[1+m\cos\omega t] \quad (1)$$

with A being the carrier amplitude and $m$ being the index of modulation at frequency $\omega$.

At the time $b$ shown in FIG. 2B, the switch 30 common member 31 contacts the terminal $\mathbf{32}_2$ and hence is energized with a voltage $e(b)$ coincidentally produced by the detector $\mathbf{25}_2$ where $$e(b)=A[1+m\cos\theta] \quad (2)$$

with $\theta$ identifying the phase change undergone by the FIG. 2B sinusoid between the times $a$ and $b$ shown therein.

The voltage signal $e(b)$ present at the sampling switch 30 is operative in the interval following time $b$ to charge the capacitor $\mathbf{26}_2$ through a series path comprising the switch 40 (the common member 41 and the terminal 42), the amplifier 50, the resistor 56 and the switches 60 and 33 (the common member 34 and the terminal $\mathbf{35}_2$). Accordingly, a voltage $v(b)$ is stored in the capacitor $\mathbf{26}_2$ at this time, where $$v(b)=kAG(1+m\cos\theta) \quad (3)$$

wherein G as noted above is the gain of the amplifier 50 and $k$ comprises a circuit constant of proportionality dependent upon the dwell time of the switch 30 common member 31 with the contact $\mathbf{32}_2$, and the circuit time constant principally determined by the resistor 56 and the capacitor $\mathbf{26}_2$.

By an analysis similar to that given above, the potentials $e(c)$, $e(d)$ and $e(e)$ impressed on the switch 30 common member 31 during the second, third and fourth operative cycles thereof, i.e., at the times $c$, $d$ and $e$ illustrated in FIG. 2B, which are each $T/4$ seconds or $\pi/2$ radians removed from the prior sampling interval, are given by $$e(c)=A\left[1+m\cos\left(\theta+\frac{\pi}{2}\right)\right]=A(1-m\sin\theta) \quad (4)$$

$$e(d)=A[1+m\cos(\theta+\pi)]=A(1-m\cos\theta) \quad (5)$$

$$e(e)=A\left[1+m\left(\cos\theta+\frac{3\pi}{2}\right)\right]=A(1+m\sin\theta) \quad (6)$$

During the interval following time $c$, the potential $e(c)$ charges the capacitor $\mathbf{27}_2$ to a potential $v(c)$ through a series path comprising the switch 40, the amplifier 51, the resistor 57, and the switches 65 and 37, wherein:

$$v(c)=kAG(1-m\sin\theta) \quad (7)$$

Similarly, following the times $d$ and $e$ shown in FIG. 2B, the potentials $e(d)$ and $e(e)$ are respectively inverted by the inverting elements 52 and 53, with the resulting signals being operative to charge the capacitors $\mathbf{26}_2$ and $\mathbf{27}_2$ with additional potentials $v(d)$ and $v(e)$, wherein:

$$v(d)=-kAG(1-m\cos\theta) \quad (8)$$

and $$v(e)=-kAG(1+m\sin\theta) \quad (9)$$

After one complete cycle of operation for the switch 40, corresponding to four complete operative cycles of the switches 30, 33 and 37, the net voltages $V_{26}$ and $V_{27}$ characterizing the capacitors $\mathbf{26}_2$ and $\mathbf{27}_2$ are respectively given by:

$$V_{26}=v(b)+v(d)=kAG(1+m\cos\theta-1+m\cos\theta)=2kAGm\cos\theta \quad (10)$$

and $$V_{27}=v(c)+v(e)=kAG(-m\sin\theta-1-m\sin\theta)=-2kAGm\sin\theta \quad (11)$$

Assuming that the switches 60 and 65 retain their initial state for $j$ complete cycles of the switch 40, where $j$ is a relatively small integer, the potential $\overline{V}_{26}$ and $\overline{V}_{27}$ stored in the capacitors $\mathbf{26}_2$ and $\mathbf{27}_2$ after the $j$ switch 40 cycles comprise:

$$\overline{V}_{26}=j\cdot V_{26}=2jkAGm\cos\theta \quad (12)$$

and $$\overline{V}_{27}=j\cdot V_{27}=-2jkAGm\sin\theta \quad (13)$$

After the $j$ switching cycles for the switch 40 have transpired, the switch 60 and 65 transfer members 62 and 67 are operably connected to their alternate contacts 63 and 68. Accordingly, during the next switching cycle for the switches 33 and 37, the capacitors $\mathbf{26}_2$ and $\mathbf{27}_2$ are respectively connected to the squaring circuits 70 and 71. The output potentials $P_{70}$ and $P_{71}$ generated by these circuits are given by $$P_{70}=\overline{V}_{26}{}^2=4j^2k^2A^2G^2m^2\cos^2\theta \quad (14)$$

and $$P_{71}=\overline{V}_{27}{}^2=4j^2k^2A^2G^2m^2\sin^2\theta \quad (15)$$

In response to the potentials $P_{70}$ and $P_{71}$ supplied thereto by the squaring circuits 70 and 71, the adder 75 produces a direct current potential $V_{OUT}$, where:

$$V_{OUT}=P_{70}+P_{71}=4j^2k^2A^2G^2m^2(\cos^2\theta+\sin^2\theta)=4j^2k^2A^2G^2m^2 \quad (16)$$

Thus, the adder 75 generates an output signal $V_{OUT}$ which is independent of the input sampling phase $\theta$, but which is proportional to the square of the input sinusoid amplitude, viz., $m\cdot A$. By adjusting the threshold detector 77 to respond to signals of amplitude $4j^2k^2A^2G^2m^2$, and to ignore signals of a lesser magnitude, the output utilization circuit 78 will perform the desired task of interest only when a marking sinusoid is impressed on one of the lines 20. Moreover, the output utilization circuit 78 may be synchronized with the operation of the switches 33 and 37 so that the appearance of an output response therein may be attributed to a particular one of the lines 20. In addition, it is noted that the FIG. 1 arrangement is insensitive to signals, other than the characteristic modulated carrier potential, which may appear on any of the monitored lines 20 because of the general voltage cancelling effected by the opposite polarity relationship in which detected line signals are translated to any of the capacitors 26 or 27 during alternate sampling intervals.

Moreover, the FIG. 1 arrangement has been shown by the above to effect its sampling function while employing only one detector 25 and one capacitor pair 26 and 27 as per-line equipment. Further, since the only switching requirement imposed on the instant sampling organization is that the elements 30, 33 and 37 sample each of the contacts 32, 35 and 39, respectively associated therewith every *T*/4 seconds, T can be made arbitrarily large to accommodate any number of lines to be monitored.

In summary, an illustrative scanning arrangement made in accordance with the principles of the present invention is adapted to monitor a plurality of telephone lines which are selectively marked with a sinusoidal signal characterized by a period T. Each line is examined for a short time interval every *T*/4 seconds, with alternate samples being coupled in an alternating polarity relationship to one of two capacitors associated with each line.

By first squaring and then summing the potentials stored in each capacitor pair, a voltage, proportional to the amplitude of the marking sinusoid, is generated if such a signal has in fact been impressed on the corresponding line.

It is to be understood that the above-described arrangement is only illustrative of the application of the principles of the present invention. Numerous other arrangements may be devised by those skilled in the art without departing from the spirit and scope thereof. For example, the marking sinusoid may be directly impressed by a source 10 on the corresponding line 20 in unmodulated form. In such a case, the detectors 25 could be eliminated, and the lines 20 directly interrogated by the switch 30. Alternatively, each source 10 may generate a sinusoidally-modulated noise carrier signal, as generally disclosed in my pending application Ser. No. 379,587, filed July 1, 1964.

What is claimed is:

1. In combination, a plurality of electrical lines, means for selectively impressing a sinusoidal electrical signal of period T on said lines, where T is any positive number, first and second capacitors associated with each of said lines, means for sampling each of said lines every *T*/4 seconds, and means for respectively supplying the potentials detected by said sampling means to said associated first and second capacitors in an alternating polarity relationship during alternate sampling intervals.

2. A combination as in claim 1 further comprising first and second squaring means, and switching means for sequentially connecting each associated capacitor pair to said squaring means.

3. A combination as in claim 2 further comprising an adder connected to each of said squaring means.

4. A combination as in claim 3 further comprising a threshold detector connected to said adder.

5. A combination as in claim 4 further comprising an output utilization circuit connected to said threshold detector.

6. A combination as in claim 1 wherein said selective sinusoid impressing means comprises a carrier source modulated with a sinusoidal signal.

7. A combination as in claim 6 further comprising a plurality of modulation detectors each connected to a different one of said lines.

8. A combination as in claim 2 wherein said sampling means comprises a first cyclic switch, and wherein said potential supplying means comprises a second cyclic switch including four contact terminals and a common member sequentially connecting said contact terminals, said common member being connected to said first cyclic switch, a first inverter connecting first and third ones of said four contact terminals, and a second inverter connecting second and fourth ones of said contact terminals.

9. A combination as in claim 8 wherein said potential supplying means further comprises first and second amplifiers and first and second resistors respectively serially connected with said amplifiers, said first inverter being connected to said first amplifier, and said second inverter being connected to said second amplifier.

10. In combination, a plurality of telephone lines, means for selectively impressing a sinusoidal signal of period T on said lines, where T is any positive number, first and second capacitors associated with each of said lines, means for sampling each of said lines every *T*/4 seconds and for respectively supplying the potentials there detected in alternate sampling intervals to said associated first and second capacitors in an alternating polarity relationship, adding means, and squaring means for selectively connecting each of the capacitor pairs to said adding means.

11. In combination, an electrical line, first and second capacitors associated with said line, a cyclic switch comprising a common member connected to said line and four contact terminals sequentially contacted by said common member, a first inverter connecting first and third ones of said contact terminals, a second inverter connecting second and fourth one of said contact terminals, a first amplifier and resistor series combination connecting said first inverter with said first capacitor, and a second amplifier and resistor series combination connecting said second inverter with said second capacitor.

12. A combination as in claim 11 further comprising first and second squaring circuits, and means for respectively connecting said first and second capacitors to said first and second squaring circuits.

13. A combination as in claim 12 further comprising an adder connected to said squaring circuits.

14. A combination as in claim 13 further comprising a threshold detector connected to said adder.

15. A combination as in claim 11 further comprising means for selectively impressing a sinusoidal signal on said line.

References Cited

UNITED STATES PATENTS 2,077,537 4/1937 Taylor ----------- 179—27.12

WILLIAM C. COOPER, *Primary Examiner.*